(12) United States Patent
Pen

(10) Patent No.: US 7,278,147 B2
(45) Date of Patent: Oct. 2, 2007

(54) FRONT PANEL FOR AN OPTICAL DISC DRIVE

(75) Inventor: Guo-chen Pen, Shenzhen (CN)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 625 days.

(21) Appl. No.: 10/887,011

(22) Filed: Jul. 7, 2004

(65) Prior Publication Data
US 2005/0015789 A1    Jan. 20, 2005

(30) Foreign Application Priority Data
Jul. 17, 2003    (CN) .................... 03 2 67795

(51) Int. Cl.
*G11B 33/02*    (2006.01)
(52) U.S. Cl. ...................................... 720/646
(58) Field of Classification Search ............. 720/646, 720/647, 601, 600; 369/77.11, 77.21, 75.11, 369/75.21
See application file for complete search history.

(56) References Cited
U.S. PATENT DOCUMENTS
2005/0204375 A1*    9/2005    Inoue et al. ............... 720/646

\* cited by examiner

*Primary Examiner*—Allen Cao
(74) *Attorney, Agent, or Firm*—Wei Te Chung

(57) ABSTRACT

A front panel (1) for an optical disc drive includes a main body (2) having an aperture (25) and a plurality of first fixing elements (26) adjacent to the aperture, and an operating unit (3) received in the aperture. The operating unit has two operating buttons (32, 33) adapted to control corresponding circuits of the optical disc drive, a fastening frame (30) fastened on the main body, and two elastic arms (35) interconnecting the operating buttons and the fastening frame. The fastening frame includes a plurality of second fixing elements (31) adapted to force-fittingly engage with the first fixing elements.

14 Claims, 2 Drawing Sheets

1

FRONT PANEL FOR AN OPTICAL DISC DRIVE

BACKGROUND OF THE INVENTION

1. Field of the Invention

The present invention generally relates to front panels for optical disc drives, and particularly to a front panel which is conveniently assembled.

2. Description of Prior Art

A conventional optical disc drive reads information recorded in an optical disc, and comprises a main body, a housing receiving the main body therein, and a front panel located in front of the housing which is used as an interface between users and the optical disc drive. An opening is defined in the front panel for loading optical discs into the main body and ejecting optical discs from the main body.

Some buttons are installed on the front panel for users to control operation of the optical disc drive. The buttons typically include a starting button for turning the optical disc drive on and off, and a tray button for controlling loading and ejecting of optical discs. In assembly of the optical disc drive, the buttons are generally fixed to the front panel one by one manually. Furthermore, the buttons are generally small and awkward to fix to the front panel. These difficulties make the assembly process unduly slow and laborious, and reduce the efficiency of production.

SUMMARY OF THE INVENTION

Accordingly, an object of the present invention is to provide a front panel for an optical disc drive which is conveniently assembled.

In order to achieve the object set out above, a preferred front panel for an optical disc drive comprises a main body having an aperture and a plurality of first fixing elements adjacent to the aperture, and an operating unit received in the aperture. The operating unit has two operating buttons adapted to control corresponding circuits of the optical disc drive, a fastening frame fastened on the main body, and two elastic arms interconnecting the operating buttons and the fastening frame. The fastening frame includes a plurality of second fixing elements adapted to force-fittingly engage with the first fixing elements.

Other objects, advantages and novel features of the present invention will become more apparent from the following detailed description when taken in conjunction with the accompanying drawings, in which:

DETAILED DESCRIPTION OF A PREFERRED EMBODIMENT OF THE INVENTION

Reference will now be made to the drawings to describe a preferred embodiment of the present invention in detail.

Figure 1:
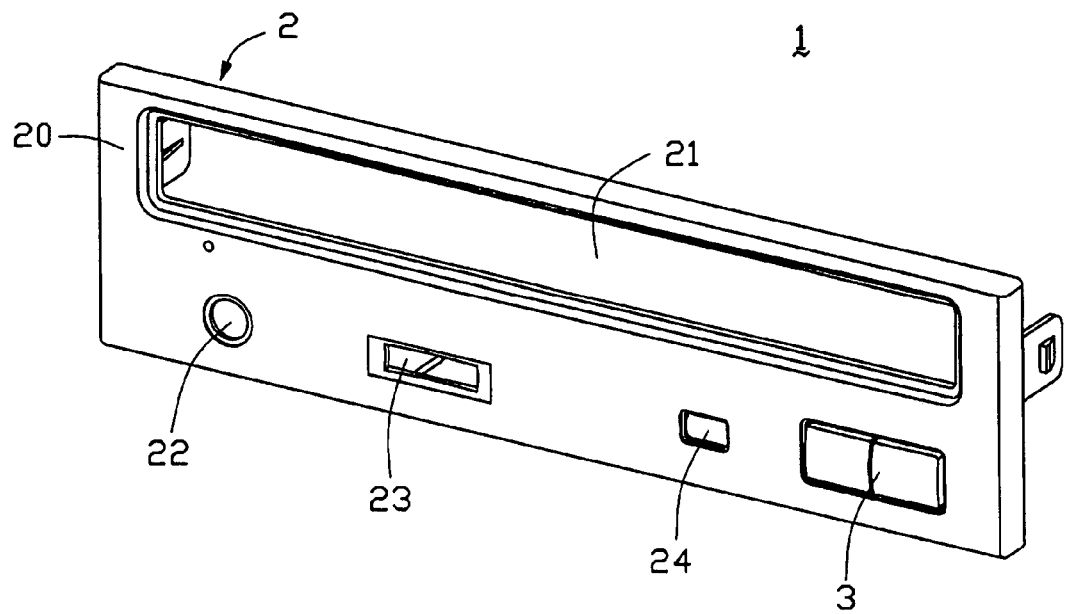
FIG. 1 is a frontal isometric view of a front panel for an optical disc drive in accordance with the present invention.
Figure 2:
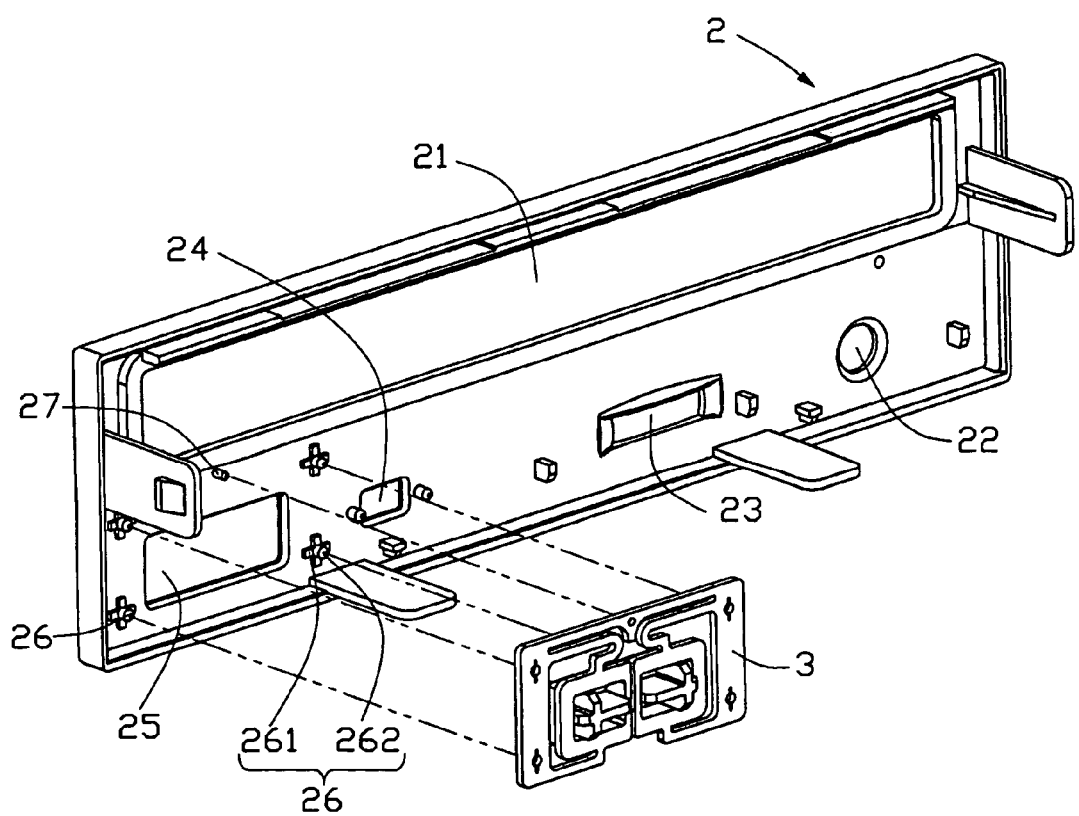
FIG. 2 is an exploded, rear isometric view of the front panel of FIG. 1.

Referring initially to FIG. 1 and FIG. 2, a front panel 1 for an optical disc in accordance with the preferred embodiment of the present invention comprises a main body 2 with a front wall 20, and an operating unit 3 fastened on the front wall 20. A rectangular opening 21 is defined in the front wall 20 for loading and ejecting of optical discs, and apertures 22, 23, 24 and 25 are defined in the front wall 20 below the rectangular opening 21. The aperture 22 is a headphone plughole, the aperture 23 is used to receive a volume modulating knob, the aperture 24 is used to transmit a light radiating from an indicator light (not shown), and the aperture 25 is used to receive the operating unit 3 therein. A plurality of fixing posts 26 and a single fixing post 27 extend from an interior surface (not labeled) of the front wall 20 around the aperture 25, for fastening the operating unit 3 to the main body 2. Each fixing post 26 comprises a restriction part 261 and a holding part 262. Each restriction part 261 is cross-shaped, and adjoins the interior surface of the front wall 20. The restriction parts 261 provide a minimum distance between the operating unit 3 and the interior surface of the front wall 20. Each holding part 262 extends inwardly from the restriction part 261, and is adapted to engage with the operating unit 3. The fixing post 27 is located above a middle of the aperture 25.

Figure 3:
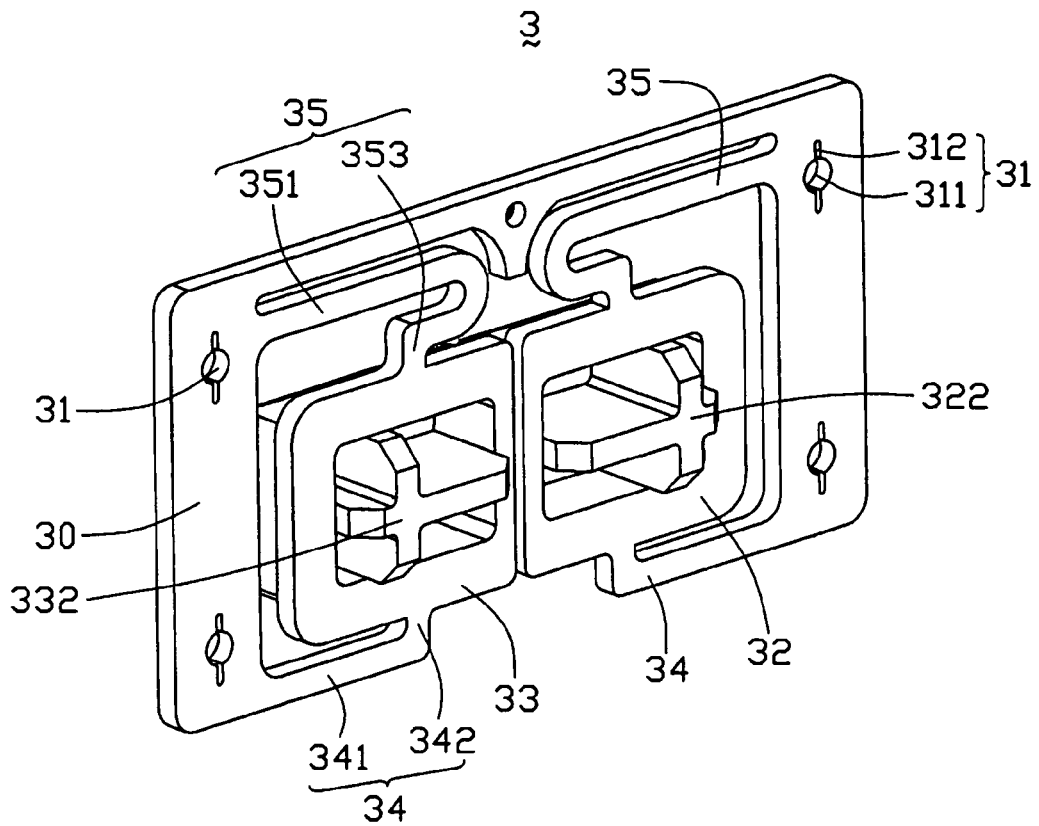
FIG. 3 is an enlarged view of an operating unit of the front panel of FIG.
Figure 4:
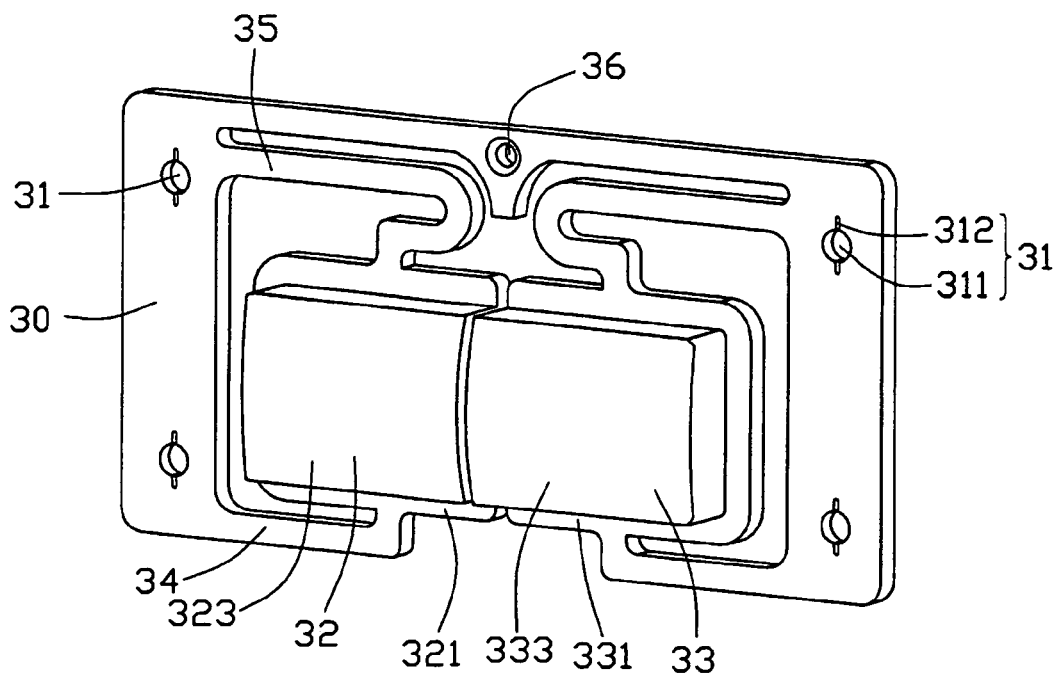
FIG. 4 is similar to FIG. 3, but viewed from a front aspect.

Referring to FIG. 3 and FIG. 4, the operating unit 3 is symmetrical, and is produced by injection molding. The operating unit 3 comprises a fastening frame 30, a first operating button 32 used to control a rate of reading of an optical disc, a second operating button 33 used to control loading and ejecting of optical discs, and two first elastic arms 34 and two second elastic arms 35 which connect the first and second operating buttons 32 and 33 with the fastening frame 30. Each operating button 31 and 32 respectively comprises a housing 321, 331, a cross-shaped contact part 322, 332 protruding rearward from a middle of the housing 321, 331, and an operating interface 323, 333 at a front of the housing 321, 331.

The fastening frame 30 includes opposite first and second lateral sides (not labeled), and a third top side (not labeled) between the first and the second lateral sides. A plurality of holes 31 is defined in the lateral sides, for engagingly receiving the fixing posts 26. A hole 36 is defined in a middle of the third side, for engagingly receiving the fixing post 27. Each hole 31 includes a central round part 311 that is slightly smaller than the holding part 262 of each fixing post 26, and a vertical narrow slot 312 running through a middle of the round part 311.

Each first elastic arm 34 connecting with the fastening frame 30 includes a first part 341 connecting with the corresponding lateral side, and a second part 342 perpendicularly adjoining the first part 341 and connecting with the respective first or second operating button 32, 33. Each second elastic arm 35 includes a first hook-shaped part 351 connecting with the corresponding lateral side, and a second straight part 353 adjoining and extending generally downwardly from the first hook-shaped part 351 and connecting with the respective first or second operating button 32, 33. The hook-shaped part 351 helps add to an overall length of the second elastic arm 35. Therefore the first hook-shaped part 351 can enhance the flexibility of the second elastic arm 35 and extend an operating lifetime of the operating unit 3. In summary, the first and second operating buttons 32, 33 are integrally connected with the fastening frame 30 via the first and the second elastic arms 34 and 35. Because the first and second elastic arms 34 and 35 can resiliently deform when subjected to force, the first and second operating buttons 32, 33 are movable along directions perpendicular to the operating interfaces 323, 333 respectively.

Referring to FIG. 2 and FIG. 4, when the operating unit 3 is fixed to the main body 2, the holding parts 262 of the fixing posts 26 are inserted into the round parts 311 of the holes 31, and the fixing post 27 is inserted into the hole 36. Then the operating unit 3 is pushed toward the main body 2 until it contacts the restriction parts 261 of the fixing posts 26. The operating unit 3 is thus fully attached to the main body 2.

When the holding parts 262 of the fixing posts 26 are inserted into the round parts 311 of the holes 31, the narrow slots 312 of the holes 31 are deformed by the resulting extrusion, so that the operating unit 3 and the main body 2 are securely fastened together by way of force-fitting. Further, one end of each of the first and second elastic arms 34 and 35 is fixed relative to the main body 2, whereas the other end of each of the first and second elastic arms 34 and 35 is movable when the respective first or second operating button 32, 33 is depressed. Thus, the first and the second operating buttons 32 and 33 can be moved relative to the main body 2, and the contact parts 322, 332 can contact corresponding electrical elements in order to control respective circuits.

Although the present invention has been described with reference to a specific embodiment, it should be noted that the described embodiment is not necessarily exclusive, and that various changes and modifications may be made to the described embodiment without departing from the scope of the invention as defined by the appended claims.

The invention claimed is:

1. A front panel for an optical disc drive, comprising:
a main body having an aperture and at least one first fixing element adjacent to the aperture; and
an operating unit received in the aperture, the operating unit comprising two operating buttons adapted to control corresponding circuits of the optical disc drive, a fastening frame fastened on the main body, and at least two elastic arms integrally interconnecting the operating buttons and the fastening frame;
wherein the fastening frame includes at least one second fixing element adapted to engage with the at least one first fixing element.

2. The front panel as described in claim 1, wherein the at least one first fixing element is a fixing post.

3. The front panel as described in claim 2, wherein the fixing post includes a restriction part adjoining the main body for providing a minimum distance between the operating unit and an interior surface of the main body, and a holding part extending from the restriction part and adapted to engage with the at least one second fixing element of the operating unit.

4. The front panel as described in claim 3, wherein the at least one second fixing element comprises a hole.

5. The front panel as described in claim 4, wherein the hole comprises a round part slightly smaller than the holding part of the fixing post, and a narrow slot running through a middle of the round part.

6. The front panel as described in claim 1, wherein the main body comprises four first fixing elements, and the first fixing elements are located at corresponding corners of the aperture.

7. The front panel as described in claim 1, wherein the main body comprises five first fixing elements, one of the first fixing elements is located above a middle of the aperture, and the other four first fixing elements are located at corresponding corners of the aperture.

8. The front panel as described in claim 1, wherein each elastic arm comprises a first part and a second straight part.

9. The front panel as described in claim 8, wherein the first part is straight or hook-shaped.

10. The front panel as described in claim 9, wherein the first part connects with the fastening frame, and the second straight part vertically extends from the first part and connects with the corresponding operating button.

11. The front panel as described in claim 1, wherein the elastic arms are first elastic arms located at one side of the operating buttons.

12. The front panel as described in claim 11, wherein the operating unit further comprises two second elastic arms located at an opposite side of the operating buttons, the second elastic arms integrally interconnecting the operating buttons and the fastening frame.

13. A front panel for an electronic device comprising:
a main body having an aperture and a plurality of first fixing elements surrounding the aperture; and
an operating unit comprising at least one operating button received in the aperture, a fastening frame fastened on the main body, and at least two elastic arms integrally interconnecting the operating button and the fastening frame;
wherein the fastening frame includes a plurality of second fixing elements surrounding the aperture and engaged with the at least one first fixing element.

14. A front panel for an electronic device comprising:
a main body having an aperture set and a plurality of fixing elements adjacent to the aperture; and
an operating unit comprising two operating buttons received in said aperture set, a fastening frame surrounding said two operating buttons and fastened to the main body, and at least two elastic arms integrally interconnecting the operating buttons and the fastening frame, respectively;
wherein the fastening frame includes a plurality of second fixing elements engaged with the at least one first fixing element; wherein
said two operating buttons are operated separately while commonly integrally linked to the same frame.

* * * * *